United States Patent

Senge et al.

[11] Patent Number: 5,953,078
[45] Date of Patent: Sep. 14, 1999

[54] VIDEO SIGNAL PROCESSING CIRCUIT HAVING AN INTERFACE FOR CONNECTING A COLOR CORRECTION CIRCUIT BETWEEN A NOISE REDUCTION CIRCUIT AND A CONTOUR CIRCUIT

[75] Inventors: Michael Senge, Darmstadt; Gerhard Wischermann, Weiterstadt; Holger Rückert, Reinheim; Manfred Dworatzek, Ober-Ramstadt, all of Germany

[73] Assignee: U.S. Philips Corporation, New York, N.Y.

[21] Appl. No.: 08/926,318

[22] Filed: Sep. 5, 1997

[30] Foreign Application Priority Data

Sep. 11, 1996 [DE] Germany .............. 196 36 862

[51] Int. Cl.⁶ .................................. H04N 5/21
[52] U.S. Cl. .................. 348/624; 348/630; 348/649
[58] Field of Search .................. 348/607, 624, 348/606, 625, 630, 645, 649, 708; 382/266, 275, 274, 167; H04N 5/21, 5/213, 5/208, 9/64

[56] References Cited

U.S. PATENT DOCUMENTS

| 5,091,978 | 2/1992 | Hirota | 382/167 |
| 5,181,100 | 1/1993 | Hodgson | 348/607 |
| 5,390,264 | 2/1995 | Ishihara | 382/266 |
| 5,467,412 | 11/1995 | Capitant | 382/167 |
| 5,555,021 | 9/1996 | Igarashi | 348/222 |
| 5,767,900 | 6/1998 | Tnaji | 348/625 |

Primary Examiner—Sherrie Hsia
Attorney, Agent, or Firm—Edward W. Goodman

[57] ABSTRACT

A device for processing video signals includes a noise reduction arrangement and a contour correction arrangement. To improve color correction, a color correction arrangement (11) is arranged between the noise reduction arrangement (10) and the contour correction arrangement (12).

2 Claims, 1 Drawing Sheet

VIDEO SIGNAL PROCESSING CIRCUIT HAVING AN INTERFACE FOR CONNECTING A COLOR CORRECTION CIRCUIT BETWEEN A NOISE REDUCTION CIRCUIT AND A CONTOUR CIRCUIT

BACKGROUND OF THE INVENTION

1. Field of the Invention

The invention relates to a device for processing video signals, comprising a noise reduction arrangement and a contour correction arrangement. The invention also relates to a method of noise reduction and contour correction.

2. Description of the Related Art

When generating, processing and transmitting video signals, noise reducers are used which eliminate noise signals in the video signal as much as possible. To compensate for losses which occur in high-frequency signal components, a contour correction is often performed after the noise reduction. Since the number of circuit components for a contour correction is relatively small as compared with the number of circuit components for noise reduction, noise reduction and contour correction are preferably performed in a common circuit arrangement. A device which combines both the functions of noise reduction and contour correction, as well as other functions is commercially available as type MNR11 from Philips BTS and described in a brochure.

Video signals are generally not only disturbed by noise signals but also have color offsets which are due to, for example different phase delay times. These color offsets can generally be eliminated completely by means of an arrangement for color correction. Because of their complexity, color correction arrangements are generally independent apparatuses. As has been proved in practice, no satisfactory results with the color correction could be achieved when a color correction apparatus and a combined device as described in the opening paragraph, performing both noise reduction and contour correction, were used simultaneously.

SUMMARY OF THE INVENTION

It is an object of the invention to optimize the picture quality achievable with a color correction arrangement in a conventional device for processing video signals.

In a conventional device for processing video signals, this object is achieved in that a color correction arrangement is arranged between the noise reduction arrangement and the contour correction arrangement.

With an intermediate arrangement of the color correction arrangement, the color correction is directly performed on the noise-reduced signal and the contour correction is performed on the color-corrected signal. To this end, the output signals of the noise reduction arrangement are applied as input signals to the color correction arrangement, and the output signals of the color correction arrangement are applied as input signals to the contour correction arrangement.

The best result is achieved with signals processed in this sequence. In a particular embodiment, a noise reduction and contour correction arrangement has an interface for connection of a color correction arrangement. When a color correction apparatus is connected to the interface of a noise and contour correction arrangement, internally provided signal connections between the noise reduction and contour correction arrangements are interrupted and, instead, the noise reduction output signal is applied via the interface to the color correction apparatus and the color correction output signal is applied via the interface to the contour correction arrangement. Whenever required, the color correction arrangement can be connected between the noise reduction and contour correction arrangements in this way. The use of an interface has the advantage that color correction devices which are already present can be utilized.

These and other aspects of the invention are apparent from and will be elucidated with reference to the embodiments described hereinafter.

DESCRIPTION OF THE PREFERRED EMBODIMENTS

Figure 1:
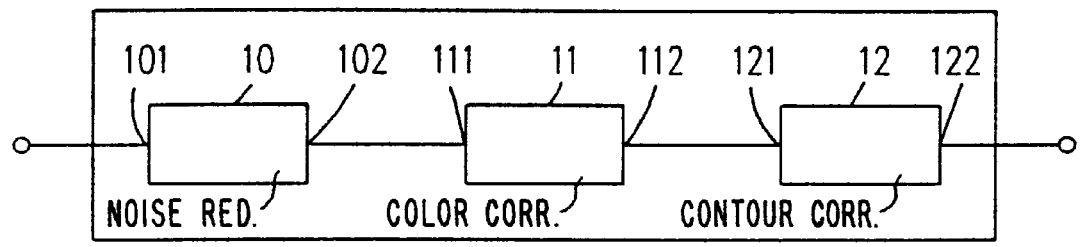
FIG. 1 shows a combined device for noise reduction, color correction and contour correction.

FIG. 1 shows an embodiment in which an arrangement 10 for noise reduction, an arrangement 11 for color correction and an arrangement 12 for contour correction are accommodated in a common device. First, a video signal to be corrected is applied via an input 101 to the noise reduction arrangement 10. The output signal from the noise reduction arrangement 10 is applied via its output 102 directly to the input 111 of a color correction arrangement 11. In this way, the color correction arrangement 11 receives a noise-reduced signal. The output 112 of the color correction arrangement 11 is directly connected to the input 121 of the contour correction arrangement 12. The contour correction is thus performed on the color-corrected signal. The output 122 of the contour correction arrangement 12 simultaneously constitutes the output of the overall device.

Figure 2:
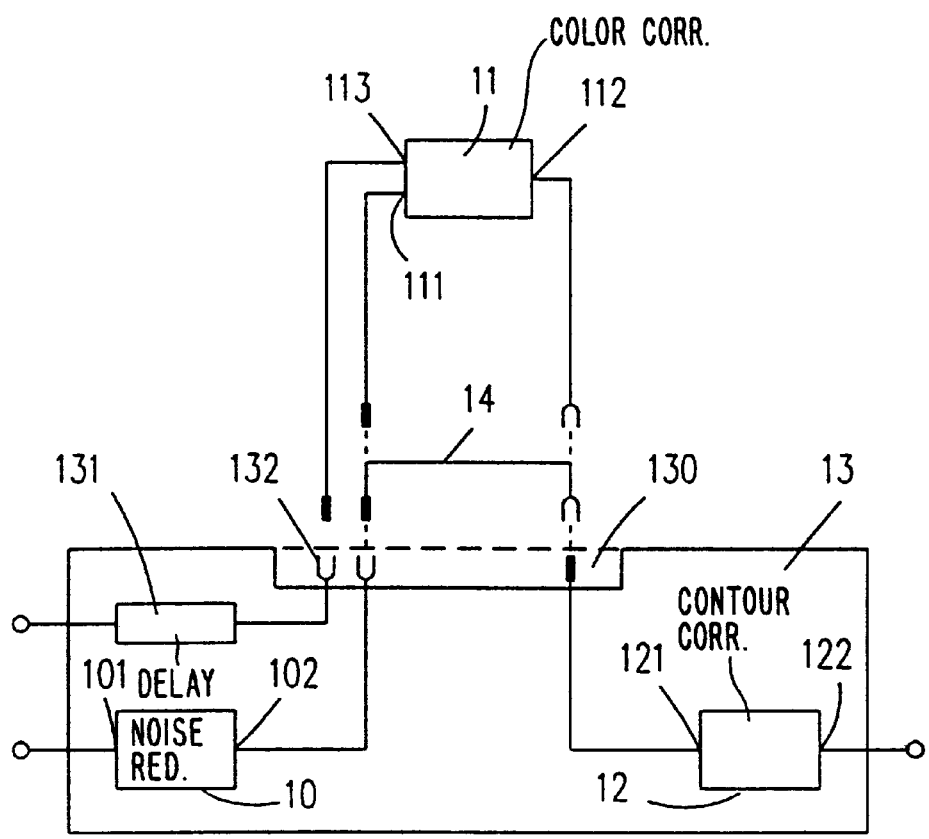
FIG. 2 shows a device for noise reduction and contour correction with an interface to a color correction device.

FIG. 2 shows a preferred embodiment in which the noise reduction arrangement 10 and the color correction arrangement 12 are combined in a single device which will hereinafter be referred to as multifunctional device 13. In the multifunctional device 13, an interface 130 for connection of an external color correction arrangement 11 is provided. The interface 130 is implemented in such a way that, if no color correction arrangement 11 is connected, the output 102 of the noise reduction arrangement is directly connected to the input 121 of the contour correction arrangement via a bridge 14. When connecting an external color correction arrangement 11, the connection between the noise reduction arrangement 10 and the contour correction arrangement 12 is interrupted by removing the bridge 14, and the output 102 of the noise reduction arrangement is connected via a contact of the interface 130 to the input 111 of the color correction arrangement 11, and the output 112 of the color correction arrangement is connected via a contact of the interface 130 to the input 121 of the contour correction arrangement 12. In this way, it is possible to connect any arbitrary color correction device to the multifunctional device 13, with noise reduction, color correction and contour correction being performed exactly in this sequence.

To compensate for the signal delay occurring in the noise reduction arrangement 10, control signals which may be optionally applied to control inputs 113 of a color correction arrangement, for example, by a film scanner, are applied to control inputs 103 of the multifunctional device 13. Delay members 131, by means of which these control signals are delayed in accordance with the transit time of the noise reduction arrangement 10, are arranged in the multifunctional device 13. The delayed control signals are applied to further contacts of the interface 130, which constitute the control outputs 132 of the multifunctional device. The control inputs 113 of the external color correction arrangement 11 may be connected to the control outputs 132 of the multifunctional device 13 so that synchronicity between the video signal applied to the external color correction arrangement 12 and the applied control signals is ensured.

What is claimed is:

1. A device for processing video signals comprising a noise reduction arrangement and a contour correction arrangement, characterized in that said device further comprises an interface for connection of a color correction arrangement, said interface having contacts connected to outputs of said noise reduction arrangement and to inputs of said contour correction arrangement for connecting said color correction arrangement between said noise reduction arrangement and said contour correction arrangement.

2. A device for processing video signals as claimed in claim 1, characterized in that the device further comprises at least a delay member having outputs connected to contacts in the interface.

* * * * *